Patented Apr. 15, 1952

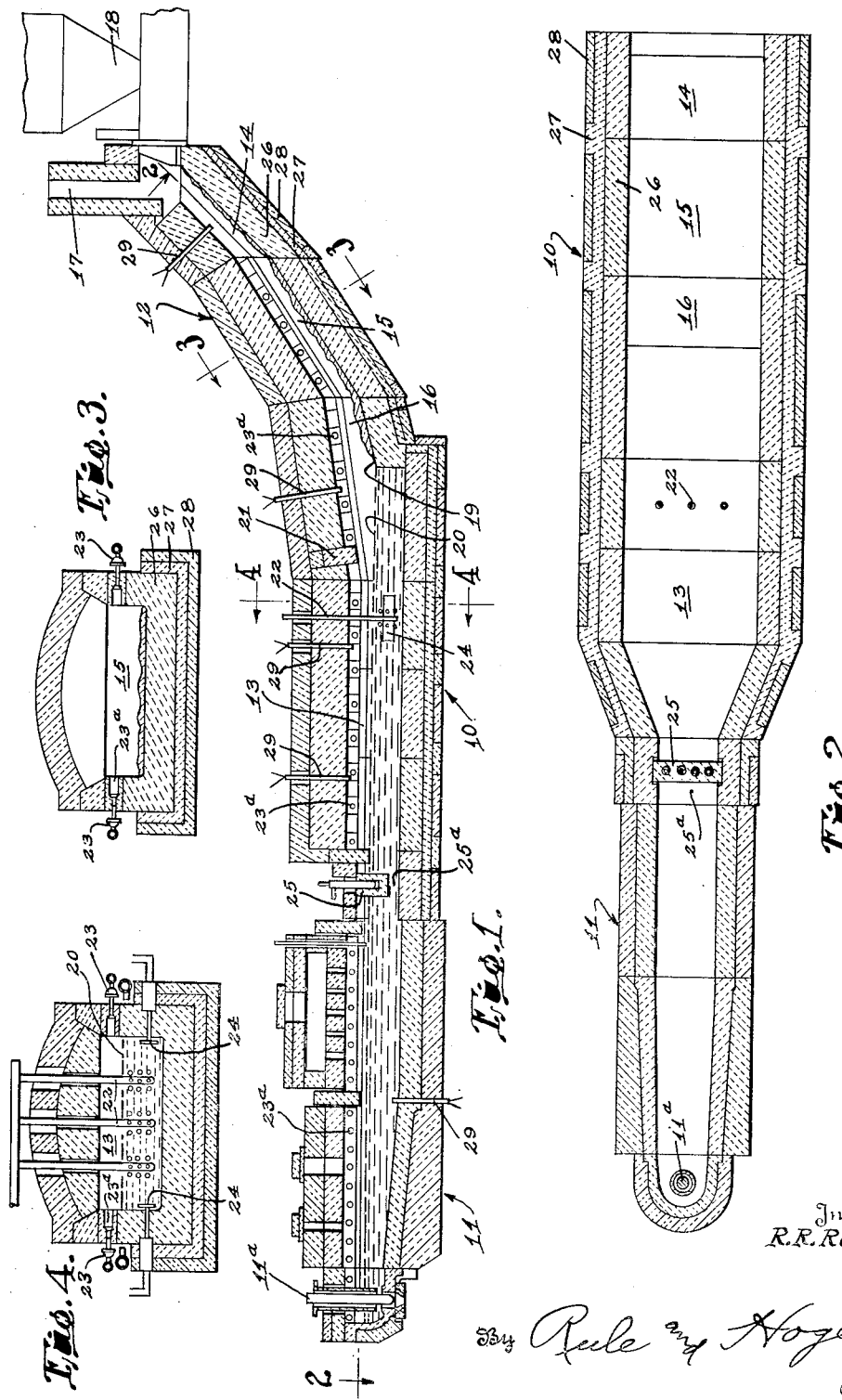

2,593,197

UNITED STATES PATENT OFFICE 2,593,197

INCLINED MELTER FURNACE AND METHOD OF MELTING GLASS

Robert R. Rough, Toledo, Ohio, assignor to Owens-Illinois Glass Company, a corporation of Ohio Application September 29, 1949, Serial No. 118,550

13 Claims. (Cl. 49—54)

This invention relates to the melting of vitreous materials by the use of an inclined type furnace.

An object of my invention is to provide a long, direct-fired melter furnace which will rapidly melt and refine a large quantity of glass at high thermal efficiency and provide a continuous supply of seed-free, homogeneous glass suitable for glass containers.

Another object of the invention is to provide an inclined feeder melter furnace wherein a large percentage of the heat of the exhaust gases is transmitted to the entering batch materials. Another object of my invention is to decrease heat radiation losses by providing a melter furnace with a minimum wall area. Another object of the invention is to provide an inclined melter furnace wherein no pile-up of materials at the point of entrance and no resultant back pressure on the batch feeder mechanism occur.

Another object of the invention is to provide an inclined melter furnace which will operate with a minimum wearing away of refractory.

Another object of the invention is to provide an inclined melter furnace wherein the melting can be easily controlled without projecting refractory elements in the path of the batch materials.

Other objects of my invention will appear hereinafter.

Referring to the drawings:

Fig. 1 is a sectional elevational view of the inclined melter furnace and forehearth;

Fig. 2 is a sectional view at the line 2—2 on Fig. 1;

Fig. 3 is a sectional view at the line 3—3 on Fig. 1; and

Fig. 4 is a sectional view at the line 4—4 on Fig. 1.

My invention basically provides for a melter furnace consisting of an inclined section of gradually and downwardly decreasing slope and a horizontal melting chamber. A measured quantity of batch materials in comminuted or powdered form is fed intermittently to the inclined section at its point of greatest slope. This material flows by gravity and collects in a thin layer on the sloped areas of the inclined section. Combustible gases or oil are introduced into the melting chamber where combustion takes place. The exhaust gases of combustion are caused to pass over the batch materials on the inclined section and are exhausted at substantially the point of introduction of the batch materials. The batch materials on the inclined section absorb the heat of the exhaust gases and become sufficiently fluid to flow into the melting chamber from the point of least slope on the inclined section.

Fig. 1 shows an inclined melter furnace 10 and means, such as a forehearth 11, for using the melted glass from the melter furnace. The forehearth 11 is of the usual type and serves to prepare the glass for final feeding by the gob feeder 11a to a glassware forming machine (not shown).

The melter furnace 10 consists of an inclined portion 12 and a melting chamber 13. Measured quantities of batch materials are intermittently fed by a feeder 18 to the inclined portion 12. The inclined portion consists of three sections, 14, 15, and 16, of gradually decreasing slope. Each of the sections is of uniform width and has a very low crown height less than the width. The first section 14 has a great slope, herein shown as at an angle of 45° to the horizontal, such that the action of gravity prevents the batch materials from collecting on it. A stack 17 is provided at substantially the uppermost point of this first section 14. The second section 15 is of medium slope, herein shown as at an angle of 35° to the horizontal, and serves as a collecting point for the measured quantity of batch material. The third section 16 has a comparatively small slope, herein shown as at an angle of 15° to the horizontal. This section serves as the final collecting point of the batch materials. At this point the melting operation has advanced to a sufficient degree to permit the measured quantity of batch materials to pass over into the melting chamber 13 as hereinafter described. The third section has the lower edge of its floor 19 substantially at the normal glass level 20 in the melting chamber 13. The shadow wall 21 may also be provided in the roof of the melting chamber as shown. It should be noted that the angles given for the inclined sections are merely representative and may be varied to meet varying conditions met within practice.

The melting chamber 13 is horizontal and substantially longer than it is wide or deep. The width of this chamber is the same as that of the inclined portion and the crown height of the chamber is less than its width. The melting chamber is provided with an outlet 25a. The cross sectional area of the chamber in the vicinity of the outlet, is gradually changed to conform to the cross sectional area of the forehearth 11.

Burners 23 are provided at intervals in the openings 23a along the side walls of the melting chamber 13. Burners may also be provided at intervals along the side walls of the inclined portion as shown. Electrodes 24 are provided for auxiliary use in supplying heat by passing electric current through the molten glass between the electrodes. Bubblers 22 are provided in the section of the melter chamber nearest the entrance of the glass to the chamber. The bubblers comprise pipes which extend below the surface of the molten glass to a point near the bottom of the furnace. Gas under pressure is supplied from sources (not shown) to the bubblers and is forced through openings in the portion of the bubblers near the bottom of the furnace. The gas bubbles, thus discharged, will rise to the surface of the molten glass in a steady stream. This bubbling action has several desirable results. First, the glass is stirred, thereby resulting in a more even refining of the glass. Second, the rising streams of bubbles prevent the surface materials and scum from flowing directly to the outlet. Third, any tendency of convection currents to form in the glass is disrupted.

A more complete description of the construction and operation of bubblers is made in Wright Patent No. 2,387,222, dated October 16, 1945. A water-cooled block or skimmer 25 is provided at the outlet 25ª of the melting chamber 13. Thermocouples 29 are provided at various points in the furnace for measuring the temperature.

The inclined portion 12 and the melting chamber 13 are made of high quality refractory 26, and are doubly insulated by the use of fire clay refractories 27 and insulating fire brick 28.

Operation

Measured quantities of batch materials are fed intermittently into the first section 14 of the inclined portion 12 of the furnace. This feeding process is intermittent in order to insure that the batch materials are in a sufficiently fluid condition to flow from the floor 19 of the third inclined section 16 and to allow the brick in the inclined portion to be reheated before the next batch is introduced. Since the first section 14 has a great slope, no materials can collect at the inlet point and thus impede the action of the feeder mechanism by causing a back pressure on the feeder. The measured quantity of batch materials quickly passes over the first section 14 and collects in a thin layer on the second and third sections. Combustible gases or oil are fired directly within the chamber 13 by means of the burners 23. The exhaust gases of combustion flow counter to the direction of the flow of the glass to the inclined portion 12 and thence over the batch materials to the stack 17. The batch materials which have collected at the inclined section absorb heat from the exhaust gases. The more volatile constituents of the batch materials melt, and the entire quantity becomes sufficiently fluid and flows over into the melting chamber 13.

Inasmuch as the crown height of the inclined portion 12 is very low, intimate contact is maintained between the hot exhaust gases and the incoming batch materials. This condition coupled with the counter flow principle and the intermittent operation which are employed, results in a remarkable recovery of the heat from the exhaust gases.

It should be noted that neither projections nor sharp corners are disposed in the path of the batch materials. Such a construction materially reduces the wearing away or erosion of the refractory material.

The bubblers 22, in the section nearest the point of entrance of the glass into the melting chamber, serve to stir the glass and make it more homogeneous, to prevent the scum on the surface of the glass from passing toward the outlet and to control convection currents of the glass. The water-cooled skimmer 25 aids in controlling the size of the outlet 25ª and also serves to reduce the temperature of the glass as desired.

The complete operation of the melter furnace is timed by properly coordinating the feeding mechanism and the burner action to insure a constant level of glass in the melting chamber. This may be accomplished by automatic means (not shown) which actuates the feeding mechanism whenever the level of the glass in the melting chamber falls below a specified level, or the burner settings may be varied to insure proper melting of the glass for a definite setting of the feeding mechanism.

I have obtained the following desirable results by the use of this inclined melter furnace:

1. The production of large quantities of seed-free homogeneous glass suitable for glass containers.
2. A higher recovery of the heat from the exhaust gases than has been previously realized in direct fired furnaces.
3. A better utilization of the heat by decreasing the wall areas without sacrificing the capacity of the furnace.
4. A reduction in the wearing away or erosion of refractory materials.
5. No pile-up of batch materials at the point of introduction, thus preventing back pressure and overload on the feeder mechanism.

Modifications may be resorted to within the spirit and scope of my invention.

I claim:

1. The method of melting glass-forming batch materials which consists in effecting gravity flow of such materials downwardly in a thin layer along a path of progressively decreasing inclination to a working chamber, heating and finally melting the materials in said chamber, confining the heat in a uniform layer above the materials in said chamber, exhausting waste heat from the chamber and confining the same to provide a blanket of substantially uniform thickness over and in intimate contact with the downwardly flowing materials, the thickness of the blanket being less than the width of the path, and causing such waste heat to move counter to the direction of flow of said materials throughout the path of progressively decreasing inclination and thereby transmitting heat to said batch materials to make the materials fluid before entering the working chamber.

2. The method of melting glass-forming batch materials which consists in effecting gravity flow of such materials in a generally sheet-like stream along a non-vertical path of progressively decreasing inclination to a working chamber, introducing combustible fuel into the working chamber and burning it therein to effect final melting of the batch materials, confining the waste gases in a uniform layer above the materials in said chamber, exhausting waste gases of combustion from the chamber and causing them to form a blanket of substantially-uniform depth over the entire incoming stream of batch materials and flow counter to the direction of movement of said stream whereby to subject such incoming materials to progressively increasing degrees of temperature, the thickness of the blanket being less than the width of the path.

3. The method of melting glass-forming batch materials which consists in effecting gravity flow of such materials in a generally sheet-like stream along a non-vertical path to a working chamber, progressively decreasing the inclination of the path in the direction of flow of such materials to said chamber, introducing combustible fuel into the working chamber, and burning it therein to effect final melting of the materials, confining the waste gases in a uniform layer above the materials in said chamber, exhausting waste gases of combustion from the chamber and causing the same to flow over and counter to the direction of movement of the incoming materials and so confining the exhausting waste gases of combustion as to provide a blanket of substantially uniform depth throughout the entire path of flow of the incoming batch materials, the thickness of the blanket being less than the width of the path.

4. A glass melting furnace comprising a working chamber, means utilizing products of combustion for heating said chamber, a combined batch feed conduit and flue for the exhaust of waste products communicating with one end of said chamber, said conduit including a floor and roof both inclined at progressively increasing angles and to approximately the same degree away from the chamber, said roof being spaced from the floor only sufficiently to permit the spreading of raw batch materials in a relatively thin layer over the floor and the movement of products of combustion thereover in intimate contact with said materials, the portion of said conduit nearest the working chamber being inclined at such an angle that the raw batch materials will collect and remain thereon until they have absorbed sufficient heat to become fluid and flow into the working chamber, and a stack communicating with said combined conduit and flue.

5. A glass melting furnace comprising a working chamber, means utilizing products of combustion for heating said chamber, a combined batch feed conduit and flue for the exhaust of waste products communicating with one end of said chamber, said conduit including a floor and roof both inclined at progressively increasing angles and to approximately the same degree away from the chamber, said roof being spaced from the floor only sufficiently to permit the spreading of raw batch materials in a relatively thin layer over the floor and the movement of products of combustion thereover in intimate contact with said materials, the portion of said conduit nearest the working chamber being inclined at such an angle that the raw batch materials will collect and remain thereon until they have absorbed sufficient heat to become fluid and flow into the working chamber, and a stack communicating with said combined conduit and flue, and means for introducing raw batch materials to the conduit substantially at its point of juncture with the stack.

6. A material melting furnace comprising an inclined section and a melting chamber: said inclined section having a gradually and downwardly decreasing slope and a constant width and a crown height less than the width, means at the point of greatest slope for introducing raw materials into said inclined section and means for exhausting gases of combustion, said inclined section being connected at its point of least slope to one end of the melting chamber, said point of least slope being slightly above the normal glass level in the melting chamber, the slope of the lower portion of the inclined position being such as to cause the materials to collect and remain thereon until they have absorbed sufficient heat to become fluid and flow into the melting chamber; said melting chamber being horizontal and having the same width as the inclined section and a crown height less than the width, means provided in said melting chamber for introducing and burning combustible fuel, said melting chamber and inclined section serving as a flue for the exhausting of the gases of combustion to the said exhausting means at the point of greatest slope of the inclined section, said chamber provided with an opening for removing the melted materials.

7. A material melting furnace comprising an inclined section and a melting chamber: said inclined section having a gradually and downwardly decreasing slope and a constant width and a crown height less than the width, means at the point of greatest slope for introducing raw materials into said inclined section and means for exhausting gases of combustion, said inclined section being connected at its point of least slope to one end of the melting chamber, said point of least slope being slightly above the normal glass level in the melting chamber, the slope of the lower portion of the inclined section being such as to cause the materials to collect and remain thereon until they have absorbed sufficient heat to become fluid and flow into the melting chamber; said melting chamber being horizontal and having the same width as the inclined section and a crown height less than the width, means provided in said melting chamber for introducing and burning combustible fuel, said melting chamber and inclined section serving as a flue for the exhausting of the gases of combustion to the said exhausting means at the point of greatest slope of inclined section, said chamber provided with an opening for removing the melted materials, said opening being at the point diametrically opposite from the point of connection of the inclined section to said melting chamber, means in said melting chamber for controlling the flow through said outlet and means for controlling the temperature at said outlet, means for stirring the melting materials, keeping the scum on the surface of the melting furnace from passing toward the outlet, and controlling the convection currents in the liquid.

8. A material melting furnace comprising an inclined section and a melting chamber: said inclined section having a gradually and downwardly decreasing slope and having a substantially constant cross section throughout its length, means at the point of greatest slope for introducing raw materials into said inclined section and means for exhausting gases of combustion, said inclined section being connected at its point of least slope to one end of the melting chamber, said point of least slope being slightly above the normal glass level in the melting chamber, the slope of the lower portion of the inclined section being such as to cause the materials to collect and remain thereon until they have absorbed sufficient heat to become fluid and flow into the melting chamber; said melting chamber being horizontal, means provided in said melting chamber for introducing and burning combustible fuel, said melting chamber and inclined section serving as a flue for the exhausting of the gases of combustion to the said exhausting means at the point of greatest slope of inclined section, said chamber provided with an opening for removing the melted materials.

9. The method of melting glass-forming batch materials which consists in effecting gravity flow of such materials downwardly along a path of progressively decreasing inclination to a working chamber, collecting said materials on the point of least inclination, introducing and burning combustible fuel transversely in said working chamber, confining the heat in a uniform layer above the materials in said chamber, exhausting waste heat from the chamber and confining the same to provide a blanket of substantially uniform thickness over and in intimate contact with the downwardly flowing materials throughout their path and causing such waste heat to move counter to the direction of flow of said material and thereby transmitting sufficient heat to said batch materials to cause them to become fluid and flow from the point of least inclination into the working chamber, the thickness of the blanket of waste gas being less than the width of the path.

10. A direct-fired furnace comprising an inclined section of gradually and downwardly decreasing slope connected to a horizontal section, means for introducing and burning combustible fuel in said horizontal section, the gases of combustion being exhausted through said inclined section, the crown height of said furnace being less than the width.

11. A direct-fired furnace comprising an inclined section of gradually and downwardly decreasing slope connected to a horizontal section, means for introducing and burning combustible fuel in said horizontal section, and means for withdrawing the gases of combustion from the furnace at a higher elevation than that at which the combustible gases are introduced, and means for intermittently introducing materials at the point of highest elevation of said inclined section, the crown height of said furnace being less than the width.

12. The method of making glass which comprises introducing measured quantities of glass-forming materials singly and in succession at predetermined time intervals into a channel at one end thereof, said materials being in comminuted form, causing each said quantity of material to move by gravity along said channel, retarding said movement by frictional resistance which is progressively increased as the material advances along said channel, and thereby causing a progressive retardation in the movement of said material and an accumulation of the material on the floor of the channel, applying heat to the material within the channel by which the material is gradually softened and reduced to a fluid form by the fluxing action of the more volatile constituents, and thereby reducing the frictional resistance and causing the material to continue its movement through the channel and to be discharged therefrom, the said time intervals being such that each said measured quantity of material is liquefied and discharged from the said channel before the next succeeding quantity is introduced.

13. The method defined in claim 12 wherein the heat is supplied by the combustion of fuel, the method including applying the hot gases of combustion to the surface of the glass in said pool in the form of a blanket of substantially uniform depth less than the width of the path, and conveying said gases of combustion through the said channel in contact with the glass-forming materials therein and in a direction counter to that in which the materials are moving through the channel.

ROBERT R. ROUGH.

REFERENCES CITED

The following references are of record in the file of this patent:

UNITED STATES PATENTS

| Number | Name | Date |
|---|---|---|
| 1,610,377 | Hitner | Dec. 14, 1926 |
| 1,751,987 | Frink | Mar. 25, 1930 |
| 1,863,156 | Frink | June 14, 1932 |
| 2,387,222 | Wright | Oct. 16, 1945 |

FOREIGN PATENTS

| Number | Country | Date |
|---|---|---|
| 644,561 | France | June 11, 1928 |